United States Patent
Reiner et al.

(10) Patent No.: US 9,665,621 B1
(45) Date of Patent: May 30, 2017

(54) ACCELERATED QUERY EXECUTION WITHIN A STORAGE ARRAY

(71) Applicant: EMC Corporation, Hopkinton, MA (US)

(72) Inventors: David Stephen Reiner, Lexington, MA (US); Nihar Nanda, Acton, MA (US); John Daniel Hushon, Medfield, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 302 days.

(21) Appl. No.: 13/804,703

(22) Filed: Mar. 14, 2013

(51) Int. Cl.
*G06F 17/30* (2006.01)
*G06F 15/16* (2006.01)

(52) U.S. Cl.
CPC .. *G06F 17/30466* (2013.01); *G06F 17/30442* (2013.01); *G06F 17/30321* (2013.01); *G06F 17/30477* (2013.01); *G06F 17/30501* (2013.01); *G06F 17/30592* (2013.01)

(58) Field of Classification Search
CPC ................................................ G06F 17/30336
USPC ......................................................... 707/607
See application file for complete search history.

(56) References Cited

U.S. PATENT DOCUMENTS

| | | | |
|---|---|---|---|
| 5,742,806 A * | 4/1998 | Reiner et al. | |
| 6,154,854 A * | 11/2000 | Stallmo | 714/6.12 |
| 6,334,123 B1 | 12/2001 | Ross et al. | |
| 6,745,198 B1 * | 6/2004 | Luo et al. | |
| 7,761,407 B1 * | 7/2010 | Stern | 707/602 |
| 8,086,585 B1 * | 12/2011 | Brashers et al. | 707/705 |
| 8,682,925 B1 * | 3/2014 | Marquardt | G06F 17/30477 707/722 |
| 8,856,079 B1 * | 10/2014 | Subramanian et al. | 707/649 |
| 2005/0102271 A1 * | 5/2005 | Robertson | 707/2 |
| 2008/0281784 A1 * | 11/2008 | Zane | G06F 17/30463 |

(Continued)

FOREIGN PATENT DOCUMENTS

WO 02/103575 A2 12/2002

OTHER PUBLICATIONS

Tech_OnTap, NetApp EF540 Flash Array—NetApp Community, Feb. 11, 2013.*

(Continued)

*Primary Examiner* — Brittany N Allen
(74) *Attorney, Agent, or Firm* — Ryan, Mason & Lewis, LLP (57) ABSTRACT

A data storage system comprises a storage array and an associated indexer that may be implemented in whole or in part within the storage array. The storage array comprises storage devices and a controller. The indexer associated with the storage array is configured to generate indexes over data stored in the storage array. The controller comprises a query processing control point configured to utilize the indexes generated by the indexer to accelerate execution of queries directed to the data stored in the storage array. The indexes may be stored in a high-speed memory of the storage array, such as flash memory. The queries executed in the storage array may comprise analytic queries that would otherwise normally be executed in an analytic data store external to the storage array. By providing index-based processing of the queries within the storage array, query processing throughput of the data storage system is substantially improved.

26 Claims, 5 Drawing Sheets

(56) References Cited

U.S. PATENT DOCUMENTS

| | | | |
|---|---|---|---|
| 2009/0006740 A1* | 1/2009 | Lubbers et al. | 711/114 |
| 2009/0171891 A1* | 7/2009 | Nochimowski et al. | 707/2 |
| 2009/0276426 A1* | 11/2009 | Liachenko | G06F 17/30684 |
| 2010/0114899 A1 | 5/2010 | Guha et al. | |
| 2010/0274765 A1* | 10/2010 | Murphy | G06F 11/1451 707/652 |
| 2011/0231372 A1 | 9/2011 | Wrabetz et al. | |
| 2012/0136841 A1* | 5/2012 | Ambat et al. | 707/692 |
| 2012/0323884 A1* | 12/2012 | Draese | G06F 17/30424 707/713 |
| 2013/0054642 A1* | 2/2013 | Morin | G06F 17/30557 707/770 |
| 2013/0166568 A1* | 6/2013 | Binkert | G06F 17/30911 707/741 |

OTHER PUBLICATIONS

Finke, Active-active array vs active-passive array Storage arrays explained, 2009.*
Greenplum, Greenplum Database Administrator Guide, Version 3.3.7, Aug. 17 2010.*
A. Rosenthal et al., "An Architecture for Query Optimization," ACM SIGMOD International Conference on Management of Data, Jun. 1982, pp. 246-255.
Attivio, Inc., "Universal Index Unifies Structured Data & Unstructured Content," http://www.attivio.com/products/technology/universal-index.html, 2013, 2 pages.
WHAMTECH, "External Index and Query (EIQ) Products One-Page Summary," Virtual Real-Time Data Access, Analytics, Integration, Sharing and Interoperability, Revision 1.7, Jan. 2012, 1 page.

* cited by examiner

ACCELERATED QUERY EXECUTION WITHIN A STORAGE ARRAY

FIELD

The field relates generally to data storage systems, and more particularly to data storage systems that incorporate storage arrays.

BACKGROUND

A wide variety of different types of data storage systems are known, including, by way of example, tiered storage systems, cloud storage systems and storage systems of virtual data centers. These and other data storage systems generally comprise one or more storage arrays, each comprising multiple hard disk drives, solid state drives or other storage devices. Such data storage systems often further comprise additional related entities such as database management systems or data stores.

In conventional practice, an external database management system or data store is commonly utilized to process queries relating to data stored in an underlying storage array. For example, analytic queries may be generated against an analytic data store to harvest data periodically from an underlying storage array.

Accordingly, in these and other conventional arrangements, query processing is typically performed entirely outside of the storage array. Such query processing can involve computations that require multiple round trips between an external query processing engine and the storage array, and considerable data movement before predicates, joins, and other query processing operations can be applied to the data. As a result, under current practice analytic queries against medium or large amounts of data stored in a storage array tend to execute slowly and consume excessive input-output (IO) capacity.

This deficiency of the prior art has generally precluded the execution of analytic queries against production online transaction processing (OLTP) systems for fear of the impact on production. Instead, data is laboriously and repeatedly extracted to warehouses, marts, and other destinations for analysis. This introduces latency, raises consistency and data freshness issues, and increases costs. Conventional processing of analytic queries is similarly deficient in numerous other data storage system contexts.

SUMMARY

Illustrative embodiments of the present invention provide data storage systems that are configured to permit analytic queries and other types of queries to be executed within a storage array itself rather than in an associated external database management system or data store. Execution of the queries is accelerated using indexes that are built by an indexer of the storage array over data stored in the storage array.

In one embodiment, a data storage system comprises a storage array and an associated indexer that may be implemented in whole or in part within the storage array. The storage array comprises storage devices and a controller. The indexer associated with the storage array is configured to generate indexes over data stored in the storage array. The controller comprises a query processing control point configured to utilize the indexes generated by the indexer to accelerate execution of queries directed to the data stored in the storage array.

The indexes may be stored in a memory of the storage array, such as a flash memory or other high-speed memory of the storage array. Other types of storage array memory including disk-based memory may be used to store the indexes. Storage tiering techniques may be applied to control the particular type of storage array memory in which the indexes are stored at any particular time. Also, data protection techniques may be used to ensure adequate protection of the indexes when stored in the storage array.

The queries executed in the storage array may comprise, for example, analytic queries that would otherwise normally be executed in an analytic data store external to the storage array. By providing index-based processing of the queries within the storage array itself, query processing throughput of the data storage system is substantially improved. For example, in OLTP systems, latency is avoided, consistency and data freshness issues are resolved, and costs are decreased. Also, actual execution speed is accelerated due to use of the indexes as compared to use of an extracted version of the stored data.

The data storage system may be implemented using one or more processing devices of a processing platform in an information processing system.

DETAILED DESCRIPTION

Illustrative embodiments of the present invention will be described herein with reference to exemplary data storage systems comprising storage arrays. It is to be appreciated, however, that the invention is not restricted to use with the particular illustrative system and device configurations shown. Accordingly, the term "data storage system" as used herein is intended to be broadly construed, so as to encompass, for example, private or public cloud storage systems, as well as other types of storage systems comprising physical or virtual storage resources in any combination.

Figure 1:
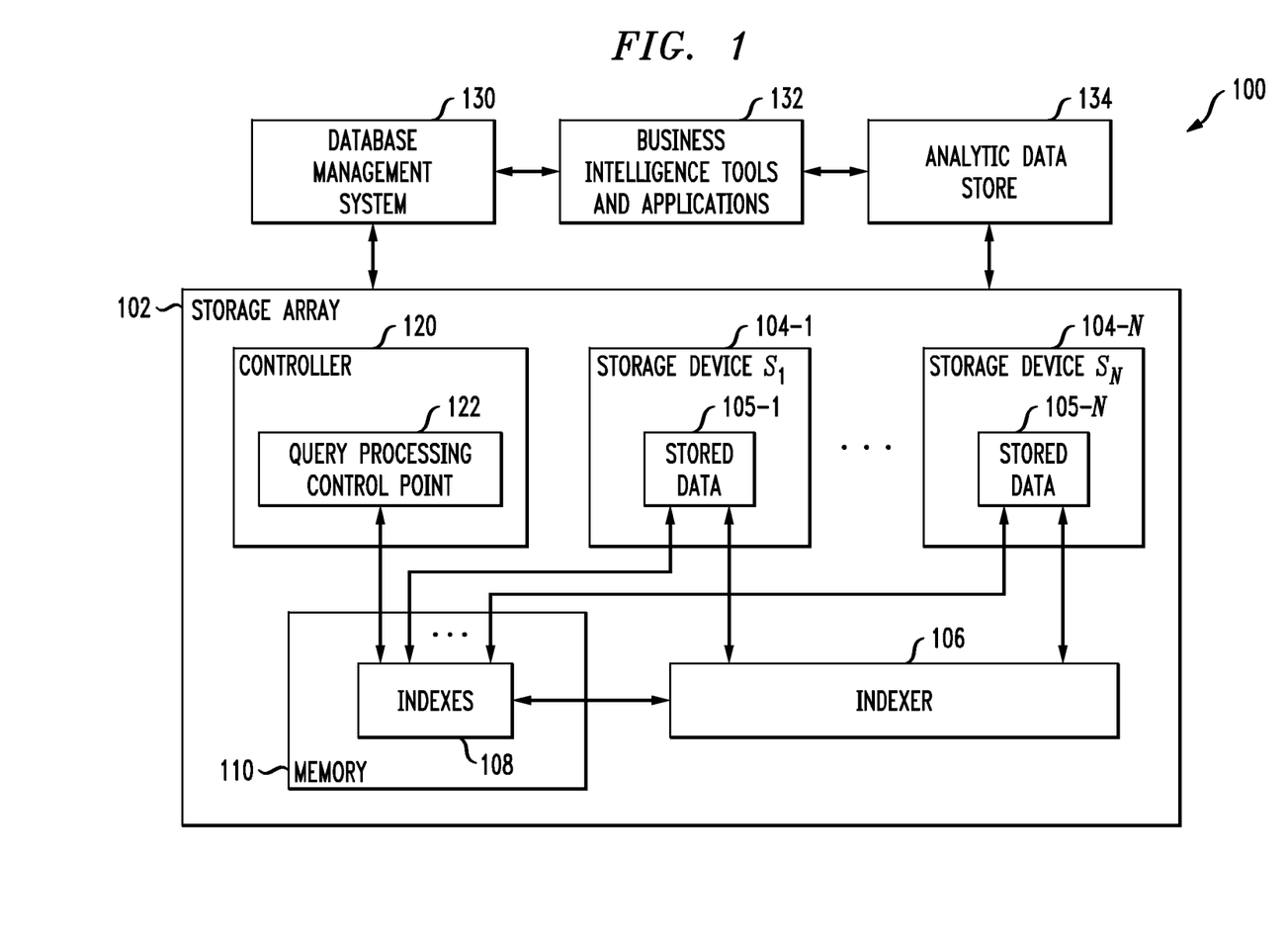
FIG. 1 is a block diagram of a data storage system comprising a storage array configured to provide acceleration of query execution in an illustrative embodiment of the invention.

FIG. 1 shows a data storage system 100 in accordance with an illustrative embodiment of the present invention. The data storage system 100 comprises a storage array 102 that includes a plurality of storage devices 104-1, 104-2, . . . 104-N that store respective sets of data 105-1, 105-2, . . . 105-N. The storage devices 104-1, 104-2, . . . 104-N are also denoted in the figure as storage devices $S_1, S_2, \ldots S_N$, respectively. The storage array 102 further comprises an indexer 106 that is coupled to each of the storage devices 104 and is configured to generate indexes 108 over stored data 105 of the storage devices 104.

The indexes 108 are stored in a memory 110 of the storage array. The memory 110 may be implemented as a flash memory or other type of high-speed memory of the storage array 102. Other types of storage array memory including disk-based memory may be used to the store the indexes 108.

In addition, the indexes 108 or particular portions thereof may be moved among multiple memories of different types within the storage array 102 using storage tiering techniques, including techniques known as Fully Automated Storage Tiering (FAST). These techniques may be used to control the particular type of storage array memory in which the indexes 108 or portions thereof are stored at any particular time, based on usage rates and other factors. For example, portions of the indexes 108 that are more frequently used than other portions may be promoted into a faster memory.

Also, various data protection techniques such as checkpointing may be used to ensure adequate protection of the indexes 108 when stored in the memory 110 of the storage array 102. Checkpointing may be implemented using mechanisms such as RecoverPoint from EMC Corporation of Hopkinton, Mass. Appropriate security protections can be implemented for the indexes 108, and other portions of the storage array 102, possibly through the use of credentials.

The storage array 102 further comprises a controller 120 that includes a query processing control point 122 configured to utilize the indexes 108 generated by the indexer 106 to accelerate execution of queries directed to the data 105 stored in the storage devices 104 of the storage array 102. The memory 110 that contains the indexes 108 is accessible to the controller 120 and its query processing control point 122. In some embodiments, the query processing control point 122 comprises a query director implemented using a container within the storage array, or one or more other components of the storage array. Embodiments incorporating query directors will be described in conjunction with FIGS. 3 and 5.

The indexes 108 may comprise, for example, one or more join indexes and one or more content indexes, with the query processing control point 122 being configured to accelerate execution of a given one of the queries by performing join processing over both the join and content indexes. Also, multiple join strategies can be implemented in the query processing control point 122, such as merge and nested-loops joins.

The indexer 106 may be configured to perform real-time indexing of stored data 105, possibly using indexing functionality associated with, for example, one or more External Index and Query (EIQ) products from WhamTech of Dallas, Tex., or the Active Intelligence Engine® from Attivio of Newton, Mass. Numerous other types of indexing may be used in implementing the indexer 106.

It should be noted in this regard that the indexer 106 may be configured to generate the indexes 108 over various combinations of unstructured and structured data sources. Such arrangements can permit join processing to be performed over unstructured but indexed data or over combinations of structured data and unstructured but indexed data. Thus, the stored data 105 over which the indexes 108 are generated may comprise unstructured data, structured data or various combinations thereof.

Moreover, the functionality of the indexer 106 may be at least in part federated so as to facilitate the building of at least a portion of one or more of the indexes 108 utilizing data from multiple distinct data sources, possibly including one or more data sources external to the storage array 102.

The data storage system 100 further comprises a database management system (DBMS) 130, business intelligence (BI) tools and applications 132, and an analytic data store 134. The DBMS 130 and the analytic data store 134 are coupled directly to the storage array 102. In this embodiment, the BI tools and applications 132 are assumed to communicate with the storage array 102 via the DBMS 130 and the analytic data store 134, although in other embodiments the BI tools and applications 132 may be configured to communicate directly with the storage array 102. For example, in an embodiment to be described below in conjunction with FIG. 4, a query router and one or more connectors are utilized to allow BI tools and applications to communicate directly with a storage array. Alternatively, such functionality can be provided using only connectors, without a distinct query router component, as in the embodiment to be described below in conjunction with FIG. 5.

The analytic data store 134 may be implemented at least in part utilizing Greenplum, commercially available from the Greenplum division of EMC Corporation. An analytic data store of this type may include a virtual "sandbox" as an interaction portal, also referred to as a Greenplum Chorus Workbench.

The analytic data store 134 typically has a substantially higher data latency than low-latency data stores such as SQLFire and GemFire, both commercially available from VMware. Such low-latency data stores may represent examples of federated data sources that may be utilized in index generation in one or more embodiments of the present invention, as indicated previously.

Numerous other data management products may be used to implement data storage system components such as DBMS 130, BI tools and applications 132, and analytic data store 134. For example, possible alternatives to Greenplum for implementing the analytic data store 134 include Hadoop file system, Hive, Netezza and others, as will be readily appreciated by those skilled in the art.

At least a subset of the queries processed using the query processing control point 122 of the controller 120 are assumed to comprise analytic queries generated at least in part utilizing the analytic data store 134, although numerous other types of queries may be generated and processed in the data storage system 100.

In this embodiment, the queries are directed against an operational data store that comprises the storage array 102, rather than against an external data store using data periodically harvested from the storage array 102. For example, the operational data store against which the queries are directed may comprise a production OLTP system.

As indicated above, in conventional practice, analytic queries are typically not executed against production OLTP systems, and instead data is laboriously and repeatedly extracted to warehouses, marts, and other destinations for analysis, which introduces latency, raises consistency and data freshness issues, and increases costs. The present embodiment overcomes these problems of conventional practice by utilizing indexes 108 to allow queries to be executed via the query processing control point 122 against an operational data store within the storage array 102 itself.

The storage array 102 may comprise storage products such as VNX and Symmetrix VMAX, both commercially available from EMC Corporation, suitably modified to incorporate the index-based query acceleration functionality disclosed herein. A wide variety of other storage products or other types of processing devices may be utilized to implement at least a portion of the storage array 102.

For example, the storage array 102 may comprise a compute-capable storage array having integrated compute capabilities and a file system configured to store the indexes 108, and possibly one or more additional components such as a hypervisor. In such an arrangement, the indexer 106 and controller 120 can be implemented primarily in software executed within the compute-capable storage array.

Accordingly, the indexer 106, controller 120 and other portions of storage array 102 may be implemented using at least one processing device. A given such processing device may comprise, for example, a computer or other type of processing device configured to communicate with other such devices over a network. Each such processing device generally comprises at least one processor and an associated memory, and implements one or more functional modules for controlling certain features of the data storage system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" comprising processor-readable storage media storing executable computer program code.

Various elements of the system 100, such as the indexer 106 and controller 120, may be implemented at least in part in the form of software that is stored in a memory of a processing device and executed by a processor of that processing device.

A given processing device may further comprise network interface circuitry that allows the device to communicate over a network with other processing devices of the data storage system 100. Such network interface circuitry may comprise, for example, one or more conventional transceivers.

The data storage system 100 may comprise a common processing platform or multiple separate processing platforms. Such processing platforms can include, for example, virtual machines implemented using one or more hypervisors running on underlying physical infrastructure.

It should be understood that the particular sets of modules and other components implemented in the data storage system 100 as illustrated in FIG. 1 are presented by way of example only. In other embodiments, only subsets of these components, or additional or alternative sets of components, may be used, and such components may exhibit alternative functionality and configurations.

As one example, the indexes 108 may be replicated within each of a plurality of different storage arrays associated with respective geographically-dispersed physical locations of the data storage system 100. Such georeplication of index files may be implemented using mechanisms such as VPLEX from EMC Corporation, and can facilitate execution of federated queries across physical locations.

Thus, although only a single storage array 102 is shown in the FIG. 1 embodiment, other embodiments may include multiple storage arrays.

The operation of the data storage system 100 will now be described in greater detail with reference to the flow diagram of FIG. 2, which illustrates an exemplary process performed in the system 100 in one embodiment. The process as shown includes steps 200 through 206, which are assumed in the present embodiment to be performed by components within the storage array 102, including indexer 106 and controller 120, but in other embodiments may involve other system components.

In step 200, the indexer 106 builds indexes 108 over data 105 stored in the storage array 102. As mentioned previously, the indexes 108 may include one or more join indexes and one or more content indexes, such that join processing can be performed over both the join and content indexes. Also as indicated above, the indexes 108 can be generated over various combinations of unstructured and structured data sources. Accordingly, portions of the stored data 105 over which the indexes 108 are generated in step 200 may be in conformance with a particular specified data model (e.g., relational, network, etc.) or may lack a data model (e.g., key-value pairs, other NoSQL databases, etc.), In step 202, the indexes 108 are stored in memory 110 of the storage array. This memory may comprise a flash memory or other high-speed memory, or one of a plurality of different types of memory subject to storage tiering based on index usage rates.

In step 204, an analytic query is received in the query processing control point 122 of the storage array 102. As noted above, such an analytic query may be generated at least in part by analytic data store 134. Alternatively, the analytic query may be generated using another system component, such as DBMS 130, or BI tools and applications 132.

In step 206, the indexes 108 are leveraged to accelerate execution of the received analytic query. This will generally involve in the present embodiment one or more of drawing information directly from the indexes and utilizing information from the indexes to facilitate access to underlying data stored in the storage array.

More particularly, the query processing control point 122 may be configured to accelerate execution of a given one of the queries by drawing information directly from the indexes 108 and generating a response to at least a portion of the given query using the information drawn directly from the indexes. This advantageously eliminates the need to access the underlying data in responding to the query.

Additionally or alternatively, the query processing control point 122 may be configured to accelerate execution of a given one of the queries by drawing information directly from the indexes, utilizing the information drawn directly from the indexes to identify particular portions of the underlying data stored in the storage array, and generating a response to at least a portion of a given one of the queries using the particular portions of the underlying data. For example, the given query can access underlying tables rapidly through low level pointers that are part of the indexes 108.

These and other processing operations carried out by the query processing control point 122 may involve decomposing a given query into multiple subqueries. For example, the query processing control point may be configured to accelerate execution of a given one of the queries by generating a plurality of subqueries for the given query, processing each of the subqueries utilizing the indexes to obtain intermediate results, aggregating or otherwise combining the intermediate results to form a final result, and returning the final result as a response to the given query.

Figure 2:
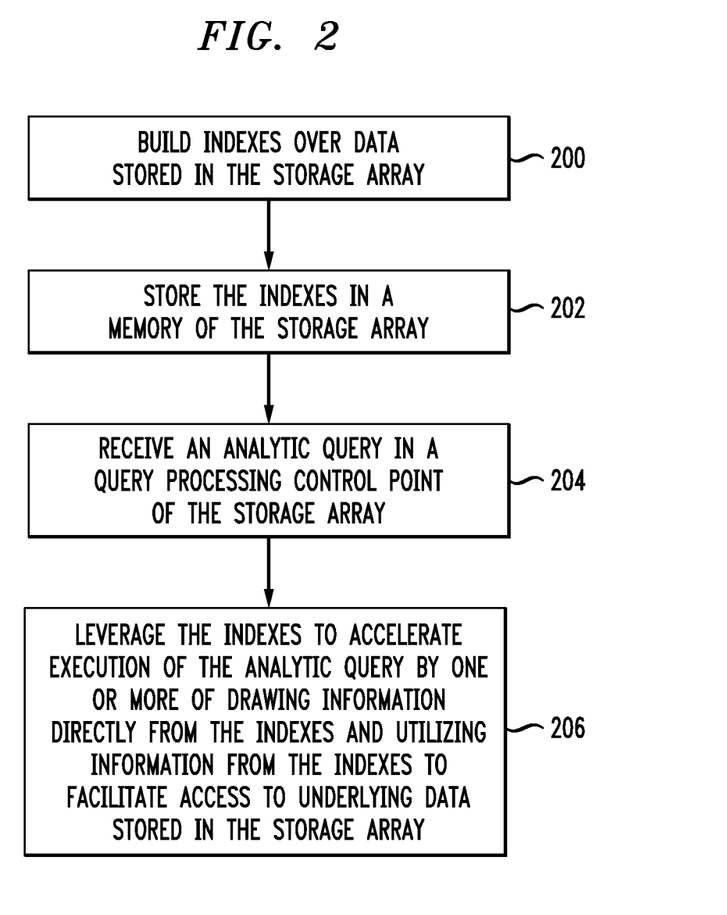
FIG. 2 is a flow diagram of a process for acceleration of query execution implemented in the storage array of the FIG. 1 data storage system.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing accelerated query processing using indexes 108 within storage array 102 of system 100. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Several other embodiments of data storage systems will now be described with reference to FIGS. 3, 4 and 5. In each of these embodiments, indexes are generated within a storage array in the manner previously described, and are utilized to accelerate execution of queries in a controller of the storage array.

Figure 3:
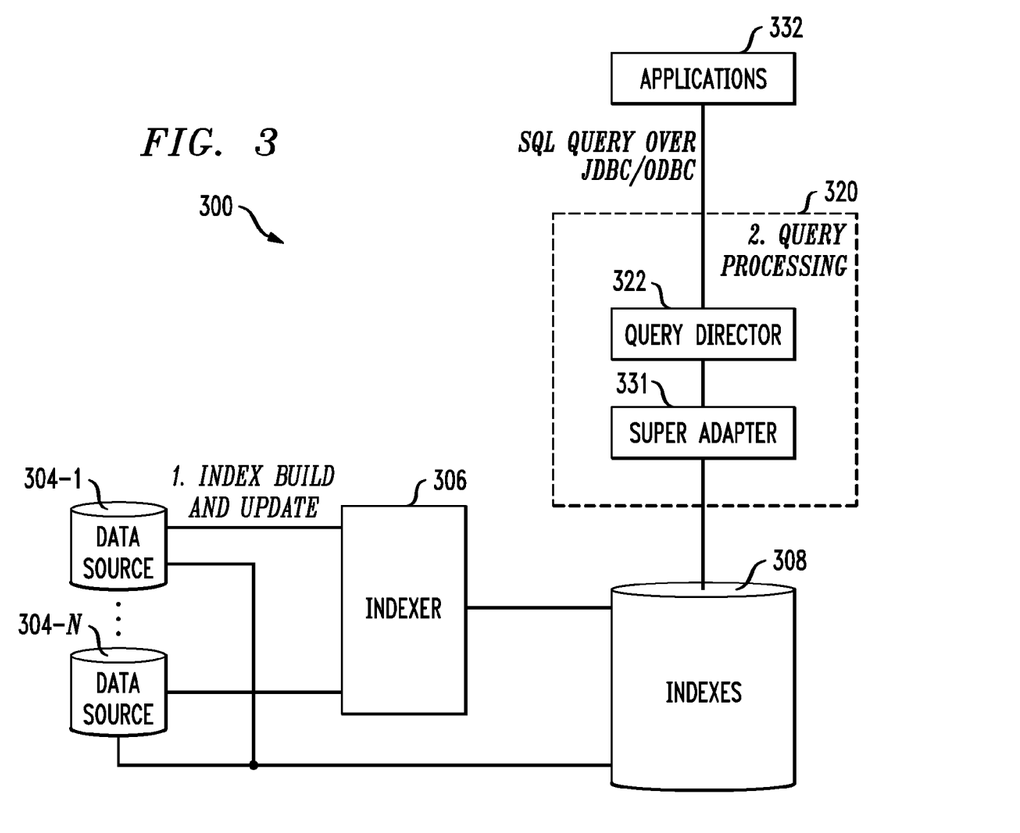
FIG. 3 illustrates accelerated query processing using indexes generated by an indexer of a storage array in another embodiment.

Referring now to FIG. 3, a data storage system 300 comprises a plurality of data sources 304-1 through 304-N. At least a subset of these data sources are assumed to be internal to a storage array that also includes an indexer 306, indexes 308 and a controller 320. The controller 320 includes a query processing control point in the form of a query director 322 having an associated super adapter 331. The super adaptor 331 may be implemented using one of the above-noted EIQ products from WhamTech.

The overall operation of the FIG. 3 embodiment can be generally separated into at least first and second portions that are at least partially concurrent. In the first portion, the indexer 306 builds and updates indexes 308, and in the second portion, the controller 320 performs accelerated query processing using the indexes 308.

The controller 320 serves as an interface between applications 332 and the indexes 308 that are generated by the indexer 306 over the data sources 304. For example, the applications 332 may be associated with BI tools or other analytic tools that generate structured query language (SQL) queries. These queries are passed to the controller 320 via connectors that in this embodiment illustratively include application programming interfaces (APIs) for Java Database Connectivity (JDBC) and Open Database Connectivity (ODBC), although other types of connectors can be used in other embodiments.

For a given SQL query from a BI tool or other analytic tool implemented using applications 332, the query director 322 may generate multiple subqueries against the relevant portions of the indexes 308 or underlying data such as tables identified by the indexes. The query director 322 also performs joins and aggregations on intermediate results, and returns a final result.

Figure 4:
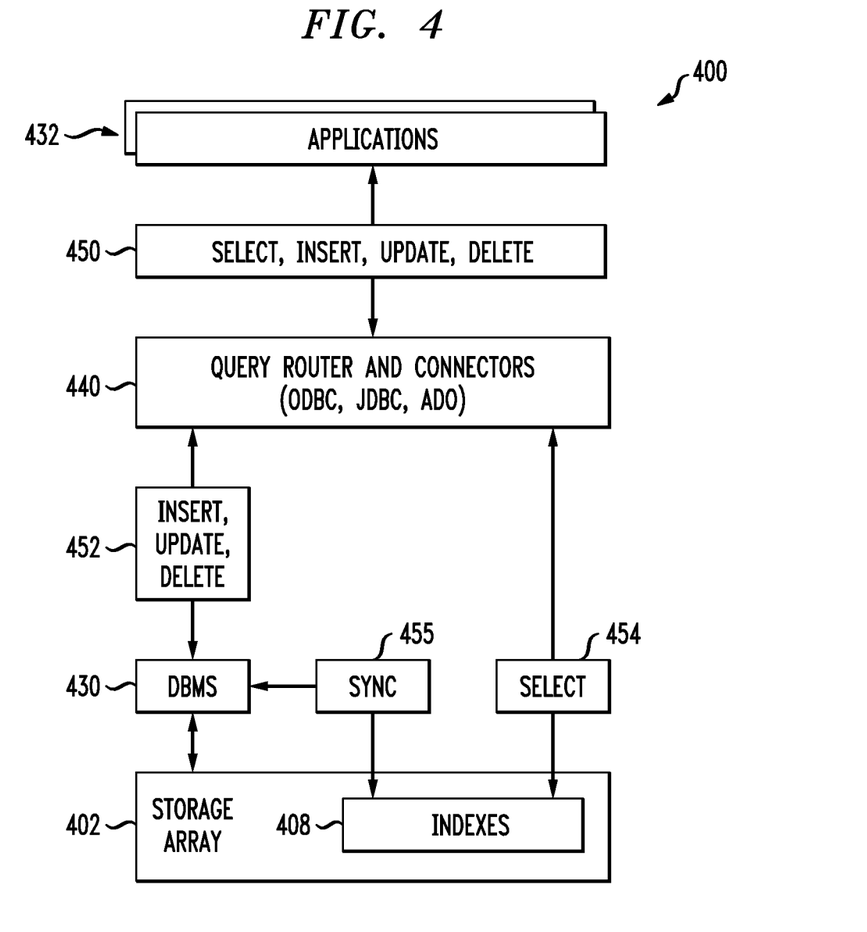
FIGS. 4 and 5 show other embodiments of data storage systems with accelerated query processing in a storage array.

In the FIG. 4 embodiment, a data storage system 400 comprises a storage array 402 that stores indexes 408. The system 400 further includes a DBMS 430, applications 432, and a query router 440 having associated connectors. The connectors of the query router 440 in this embodiment illustratively include ODBC, JDBC and ActiveX Database Object (ADO) connectors, although again other connectors can be used in other embodiments. The query router 440 interacts with applications 432 via the connectors and receives queries such as select, insert, update and delete queries 450.

The query router 440 in this embodiment directs insert, update and delete queries 452 to the DBMS 430 and directs select queries 454 directly to the indexes 408 within the storage array 402. The DBMS 430 interacts with the storage array 402 and in processing the insert, update and delete queries 452 exchanges sync messages 455 with the indexes 408. The sync messages may comprise, for example, messages associated with one or more change data capture techniques that utilize messaging to provide synchronization. In other embodiments, log scraping or other change data capture arrangements that do not involve messaging may be used to provide synchronization.

Figure 5:
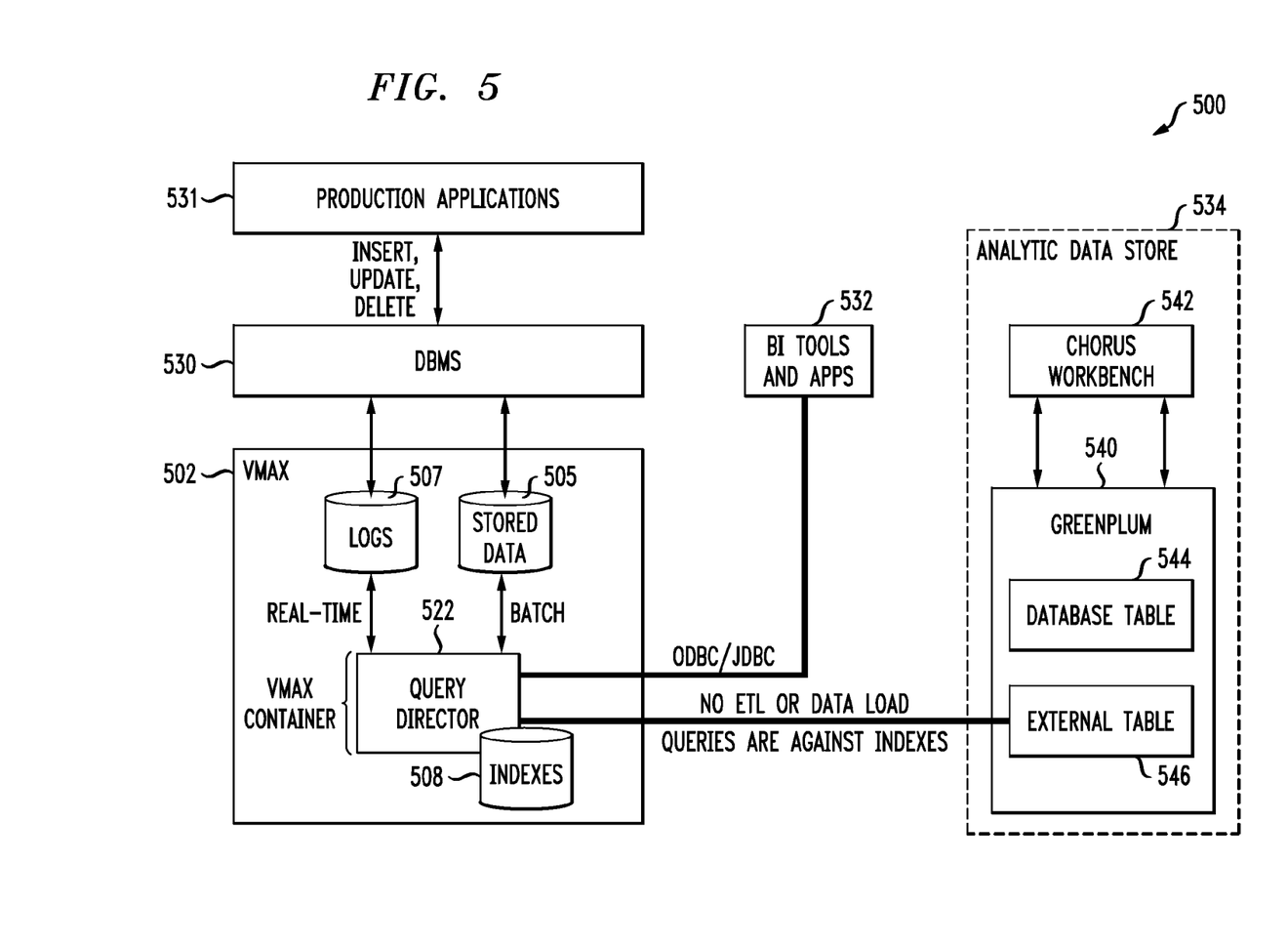

FIG. 5 shows another embodiment of a data storage system 500 with index-based query acceleration. In this embodiment, a storage array 502 more particularly comprises a VMAX storage array that incorporates stored data 505 for batch processing of queries, and associated logs 507 for real-time or near-real-time updates to indexes 508. The indexes 508 are generated over the stored data 505 and utilized to process the queries in the manner previously described. A query processing control point in the form of a query director 522 is implemented using a container of the VMAX storage array.

The storage array 502 interacts with a DBMS 530 that has associated production applications 531 that generate queries such as insert, update and delete queries. Although not specifically indicated in the figure, other types of queries may be generated by the production applications 531, such as select queries.

The query director 522 of the storage array 502 interacts with BI tools and applications 532 via ODBC and JDBC connectors as indicated. The query director 522 also interacts with an analytic data store 534 that implements a Greenplum component 540 and an associated Chorus workbench 542. The Greenplum component 540 includes at least one database (DB) table 544 and at least one external table 546. The external table 546 is used to generate queries against indexes 508 via the query director 522. This arrangement advantageously avoids the need for extract, transform and load (ETL) operations or other types of data load processing typically associated with conventional analytic data stores.

It should be understood that the embodiments of FIGS. 3, 4 and 5 are exemplary only, and numerous alternative arrangements of system components can be used to implement index-based query acceleration in a storage array.

Embodiments of the present invention can provide a number of significant advantages relative to conventional arrangements, by greatly accelerating execution of queries against a variety of data residing on a storage array. For example, in production OLTP systems and numerous other operational data stores implemented using a storage array, latency is avoided, consistency and data freshness issues are resolved, and costs are decreased. Also, actual execution speed is accelerated due to use of the indexes as compared to use of an extracted version of the stored data.

Accordingly, the disclosed embodiments allow query processing for analytic applications to be substantially improved through index-based access to structured and unstructured data inside the storage array. The ability to index both structured and unstructured content allows the storage array itself to serve as an analytic query engine for a corresponding enterprise, providing big data analytics functionality near to the actual stored data.

In addition to the above advantages, placement of analytic query capabilities within the storage array enables use of existing storage array capabilities to further accelerate analytic queries. These include, for example, use of flash memory, storage tiering, replication and checkpointing.

As indicated previously, functionality associated with index-based query acceleration within a storage array as disclosed herein can be implemented at least in part in the form of one or more software programs stored in memory and executed by a processor of a processing device such as a computer or a virtual machine.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of data storage systems comprising storage arrays, controllers, indexers and other components. Numerous other embodiments within the scope of the appended claims will be readily apparent to those skilled in the art.

What is claimed is:

1. An apparatus comprising:
    a storage array comprising a plurality of storage devices and a controller;
    an indexer implemented in the storage array and configured to generate indexes over data stored in the storage array; and
    an analytic data store;
    wherein the controller comprises a query processing control point configured to utilize the indexes generated by the indexer to accelerate execution of queries directed to the data stored in the storage array;
    wherein at least a subset of the queries directed to the data stored in the storage array comprise analytic queries generated at least in part utilizing the analytic data store;
    wherein the query processing control point is configured to draw information about the data stored in the storage array directly from the indexes and generate a response to at least a portion of a given one of the analytic queries using the information drawn directly from the indexes;
    wherein the query processing control point comprises a query director implemented in the storage array using a container of the storage array;
    wherein the query director processes queries of at least first and second different types and is configured to differentiate between queries received via at least one component of the analytic data store as being one or more of the first type queries, and queries received via one or more database connectivity connectors as being one or more of the second type queries;
    wherein the query director is further configured to:
        direct the one or more of the first type queries to the indexes instead of the data, and to direct the one or more of the second type queries to the data instead of the indexes; and
        interact with the analytic data store by receiving the one or more of the first type queries from at least one external table of the analytic data store that is configured to generate the one or more of the first type queries to be applied against the indexes via the query director;
    wherein the query director is operatively coupled to one or more logs of the storage array for implementation of updates to the indexes within the storage array;
    wherein the storage array comprises a compute-capable storage array having integrated compute capabilities and a file system configured to store the indexes; and
    wherein the indexer and the controller are implemented in software executed within the storage array.

2. The apparatus of claim 1 wherein the storage array further comprises a memory accessible to the controller and configured to store the indexes.

3. The apparatus of claim 1 wherein the analytic queries are directed against an operational data store comprising the storage array.

4. The apparatus of claim 1 wherein the query processing control point is configured to accelerate execution of the given analytic query by utilizing the information drawn directly from the indexes to identify particular portions of the data stored in the storage array, and generating a response to at least a portion of the given analytic query using the particular portions of the data.

5. The apparatus of claim 1 wherein the query processing control point is configured to accelerate execution of the given analytic query by generating a plurality of subqueries for the given analytic query, processing each of the subqueries utilizing the indexes to obtain intermediate results, combining the intermediate results to form a final result, and returning the final result as a response to the given analytic query.

6. An apparatus comprising:
    a storage array comprising a plurality of storage devices and a controller; and
    an indexer implemented in the storage array and configured to generate indexes over data stored in the storage array;
    wherein the controller comprises a query processing control point configured to utilize the indexes generated by the indexer to accelerate execution of queries directed to the data stored in the storage array;
    wherein the indexes comprise one or more join indexes and one or more content indexes;
    wherein functionality of the indexer is at least in part federated so as to permit at least a portion of one or more of the indexes to comprise data from multiple distinct data sources including one or more data sources external to the storage array;
    wherein the query processing control point comprises a query director implemented in the storage array using a container of the storage array;
    wherein the query director processes queries of at least first and second different types and is configured to differentiate between queries received via at least one component of an analytic data store as being one or more of the first type queries, and queries received via one or more database connectivity connectors as being one or more of the second type queries;
    wherein the query director is further configured to:
        direct the one or more of the first type queries to the indexes instead of the data, and to direct the one or more of the second type queries to the data instead of the indexes; and
        interact with the analytic data store by receiving the one or more of the first type queries from at least one external table of the analytic data store that is configured to generate the one or more of the first type queries to be applied against the indexes via the query director;
    wherein the query director is operatively coupled to one or more logs of the storage array for implementation of updates to the indexes within the storage array;
    wherein the storage array comprises a compute-capable storage array having integrated compute capabilities and a file system configured to store the indexes; and
    wherein the indexer and the controller are implemented in software executed within the storage array.

7. The apparatus of claim 6 wherein the query processing control point is configured to accelerate execution of a given one of the queries by performing join processing over both the join and content indexes.

8. The apparatus of claim 1 wherein the indexer is configured to generate the indexes over at least one unstructured data source so as to permit join processing to be performed over unstructured but indexed data or over combinations of structured data and unstructured but indexed data.

9. The apparatus of claim 1 wherein functionality of the indexer is at least in part federated so as to permit at least a portion of one or more of the indexes to be built utilizing multiple distinct data sources including one or more data sources external to the storage array.

10. The apparatus of claim 1 wherein the indexes are replicated within each of a plurality of storage arrays associated with respective geographically-dispersed physical locations of a data storage system.

11. The apparatus of claim 1 further comprising a query router arranged between one or more applications and at least one of the storage array and an associated database management system.

12. The apparatus of claim 3 wherein the operational data store against which the analytic queries are directed comprises a production online transaction processing (OLTP) system.

13. A data storage system comprising the apparatus of claim 1.

14. A method comprising:
generating indexes over data stored in a storage array comprising a plurality of storage devices, wherein an indexer configured to generate the indexes is implemented in the storage array; and
utilizing the indexes to accelerate execution of analytic queries directed to the data stored in the storage array by:
drawing information about the data stored in the storage array directly from the indexes; and
generating a response to at least a portion of a given one of the analytic queries using the information drawn directly from the indexes;
wherein the generating and utilizing are performed at least in part by a controller comprising a query processing control point implemented within the storage array; and
wherein the query processing control point comprises a query director implemented in the storage array using a container of the storage array;
wherein the query director processes queries of at least first and second different types and is configured to differentiate between queries received via at least one component of an analytic data store as being one or more of the first type queries, and queries received via one or more database connectivity connectors as being one or more of the second type queries;
wherein the query director is further configured to:
direct the one or more of the first type queries to the indexes instead of the data, and to direct the one or more of the second type queries to the data instead of the indexes; and
interact with the analytic data store by receiving the one or more of the first type queries from at least one external table of the analytic data store that is configured to generate the one or more of the first type queries to be applied against the indexes via the query director;
wherein the query director is operatively coupled to one or more logs of the storage array for implementation of updates to the indexes within the storage array;
wherein the storage array comprises a compute-capable storage array having integrated compute capabilities and a file system configured to store the indexes; and
wherein the indexer and the controller are implemented in software executed within the storage array.

15. The method of claim 14 further comprising updating the indexes at least one of periodically and responsive to changes in stored data.

16. The method of claim 14 wherein utilizing the indexes to accelerate execution of analytic queries directed to the data stored in the storage array comprises:
utilizing the information drawn directly from the indexes to identify particular portions of the data stored in the storage array; and
generating a response to at least a portion of the given analytic query using the particular portions of the data.

17. The method of claim 14 wherein utilizing the indexes to accelerate execution of analytic queries directed to the data stored in the storage array comprises:
receiving the given analytic query;
generating a plurality of subqueries for the given analytic query;
processing each of the subqueries utilizing the indexes to obtain intermediate results;
combining the intermediate results to form a final result; and
returning the final result as a response to the given analytic query.

18. A computer program product comprising a processor-readable storage medium having encoded therein executable code of one or more software programs, wherein the one or more software programs when executed by a processor of the storage array implement the method of claim 14.

19. The method of claim 14 wherein the indexes comprise one or more join indexes and one or more content indexes.

20. The apparatus of claim 6 wherein the indexer is configured to generate the indexes over at least one unstructured data source so as to permit join processing to be performed over unstructured but indexed data or over combinations of structured data and unstructured but indexed data.

21. The apparatus of claim 6 wherein the indexes are replicated within each of a plurality of storage arrays associated with respective geographically-dispersed physical locations of a data storage system.

22. The apparatus of claim 6 wherein functionality of the indexer is at least in part federated so as to permit at least a portion of one or more of the indexes to be built utilizing multiple distinct data sources including one or more data sources external to the storage array.

23. The apparatus of claim 6 further comprising a query router arranged between one or more applications and at least one of the storage array and an associated database management system.

24. The method of claim 14 wherein the analytic queries are directed against an operational data store comprising the storage array.

25. The method of claim 24 wherein the operational data store against which the analytic queries are directed comprises a production online transaction processing (OLTP) system.

26. The apparatus of claim 6 wherein the storage array further comprises a memory accessible to the controller and configured to store the indexes.

* * * * *